United States Patent [19]

Ribordy et al.

[11] Patent Number: 5,036,581
[45] Date of Patent: Aug. 6, 1991

[54] DRY CELL BATTERY CASING PROCESSING

[75] Inventors: James E. Ribordy, South Beloit; Siegfried Weiler, Kildeer, both of Ill.

[73] Assignee: Weiler Engineering, Inc., Arlington Heights, Ill.

[21] Appl. No.: 414,694

[22] Filed: Sep. 29, 1989

[51] Int. Cl.$^5$ .............................................. B23P 19/00
[52] U.S. Cl. ...................... 29/730; 425/116; 425/126.1; 29/623.1
[58] Field of Search .............. 29/623.1, 623.5, 730, 29/731, 729; 425/110, 111, 116, 117, 125, 126.1, 127; 53/242, 252, 235; 141/250, 284, 270

[56] References Cited

U.S. PATENT DOCUMENTS

| | | | |
|---|---|---|---|
| 3,316,127 | 4/1967 | Oswald | 29/731 X |
| 4,388,058 | 6/1983 | Kubo | 425/110 |
| 4,793,785 | 12/1988 | Osada | 425/116 |

Primary Examiner—Anthony Skapars
Attorney, Agent, or Firm—Dressler, Goldsmith, Shore, Sutker & Milnamow, Ltd.

[57] ABSTRACT

An apparatus and method for fabricating a consolidated assembly of cathode material in a dry cell battery casing having a closed end and an open end are disclosed. The casings are moved in a path to a selected transfer region, into registry with a die assembly, on a circular locus, and along an arc of the circular locus in the transfer region at the same angular velocity as the die assembly. Each casing is engaged by a rotating die assembly in which a quantity of fluent cathode material has been deposited in an upwardly open receiving chamber of the lower die assembly. The casing is retained in position on the lower die assembly while a core pin and annular shoulder punch are elevated through the receiving chamber to force the cathode material into the casing and to compact the cathode material into an annular configuration.

5 Claims, 6 Drawing Sheets

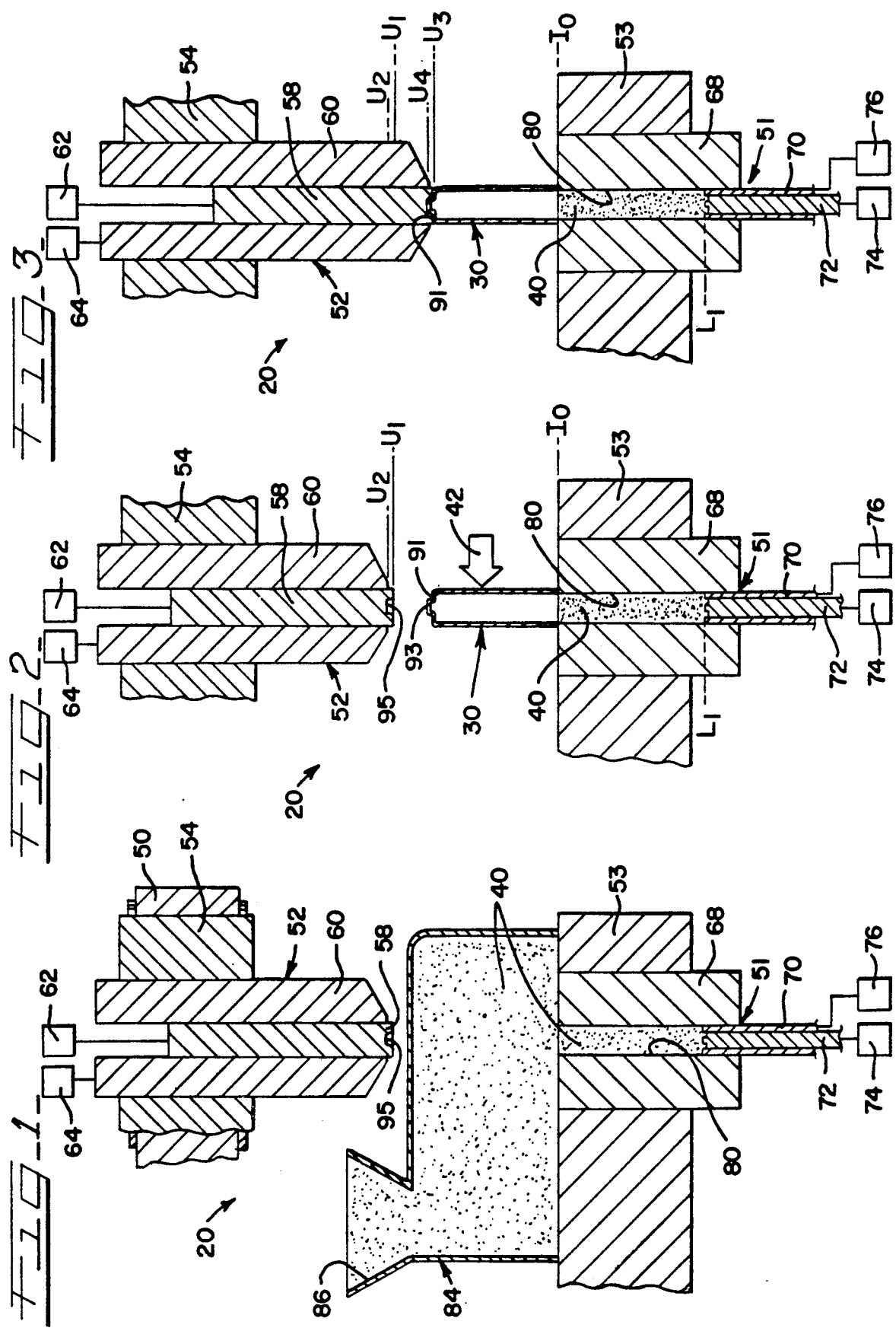

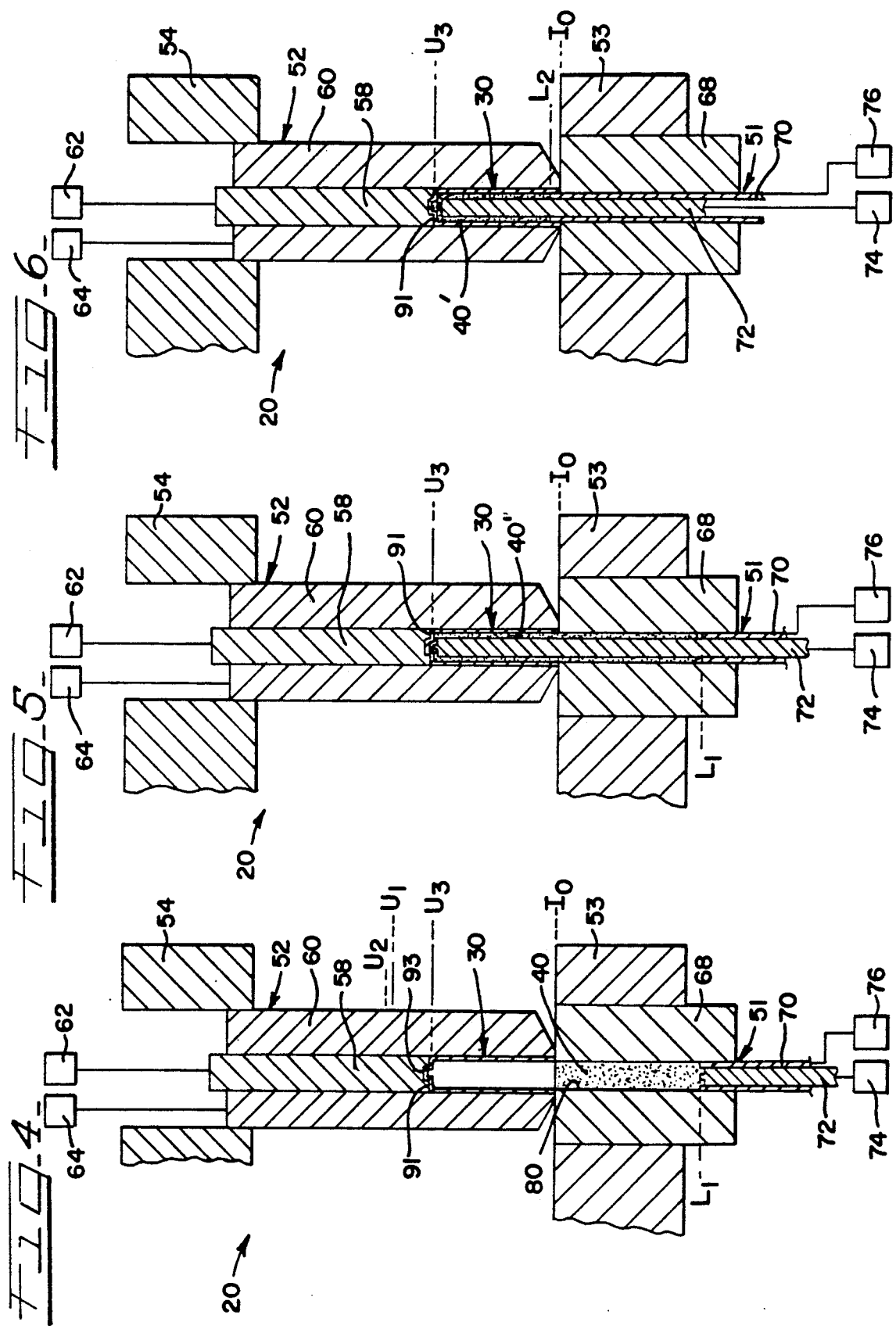

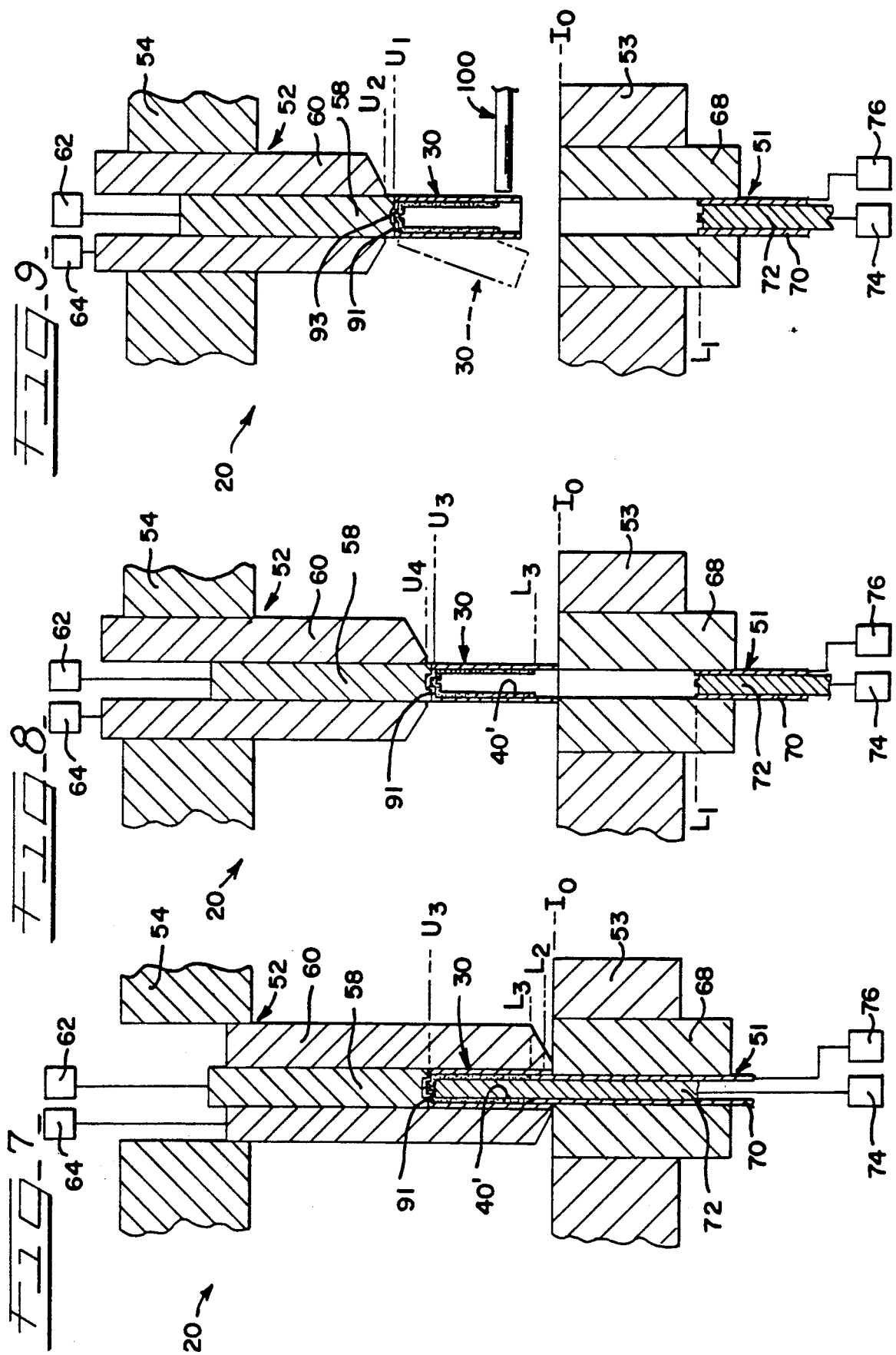

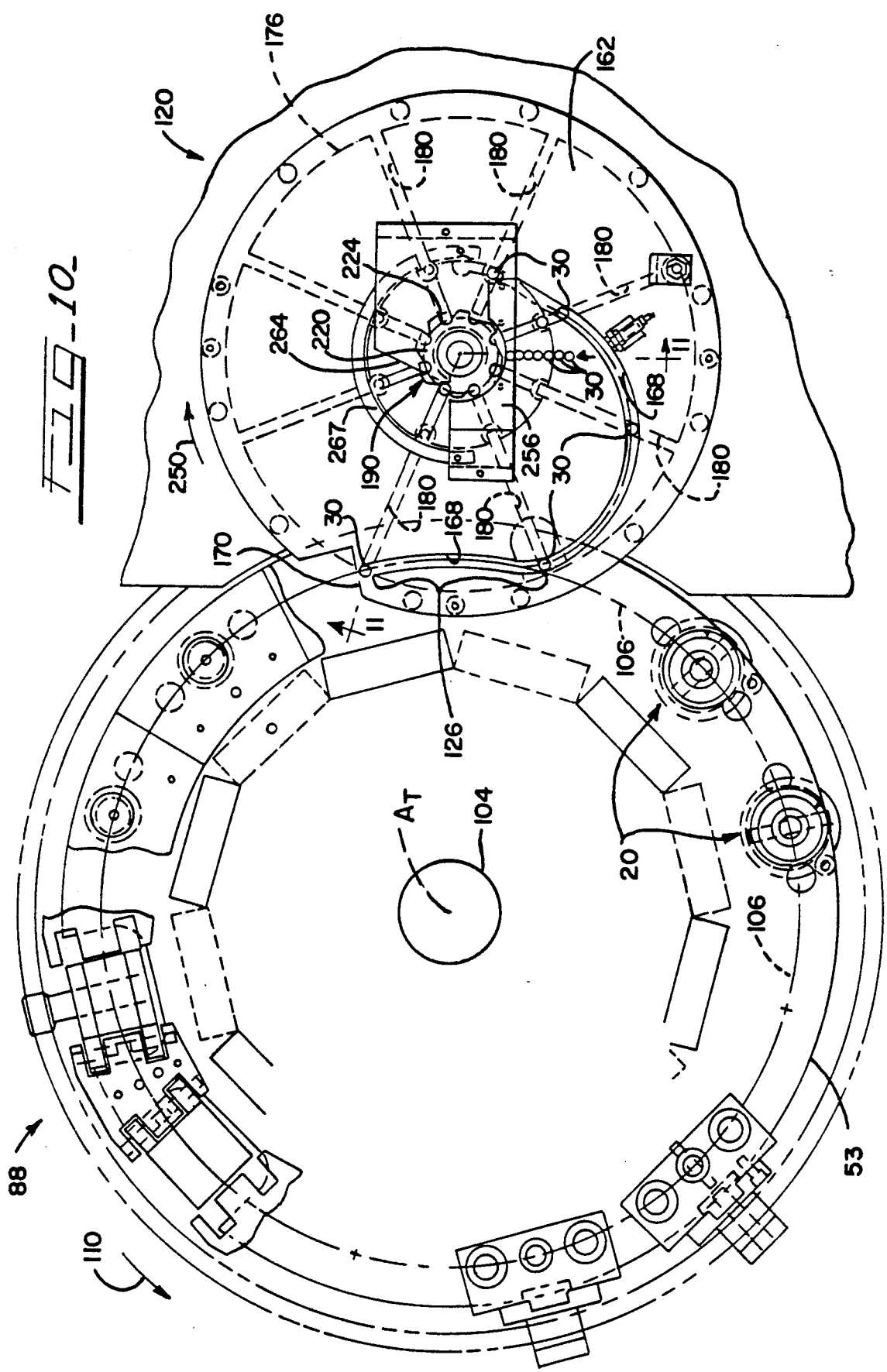

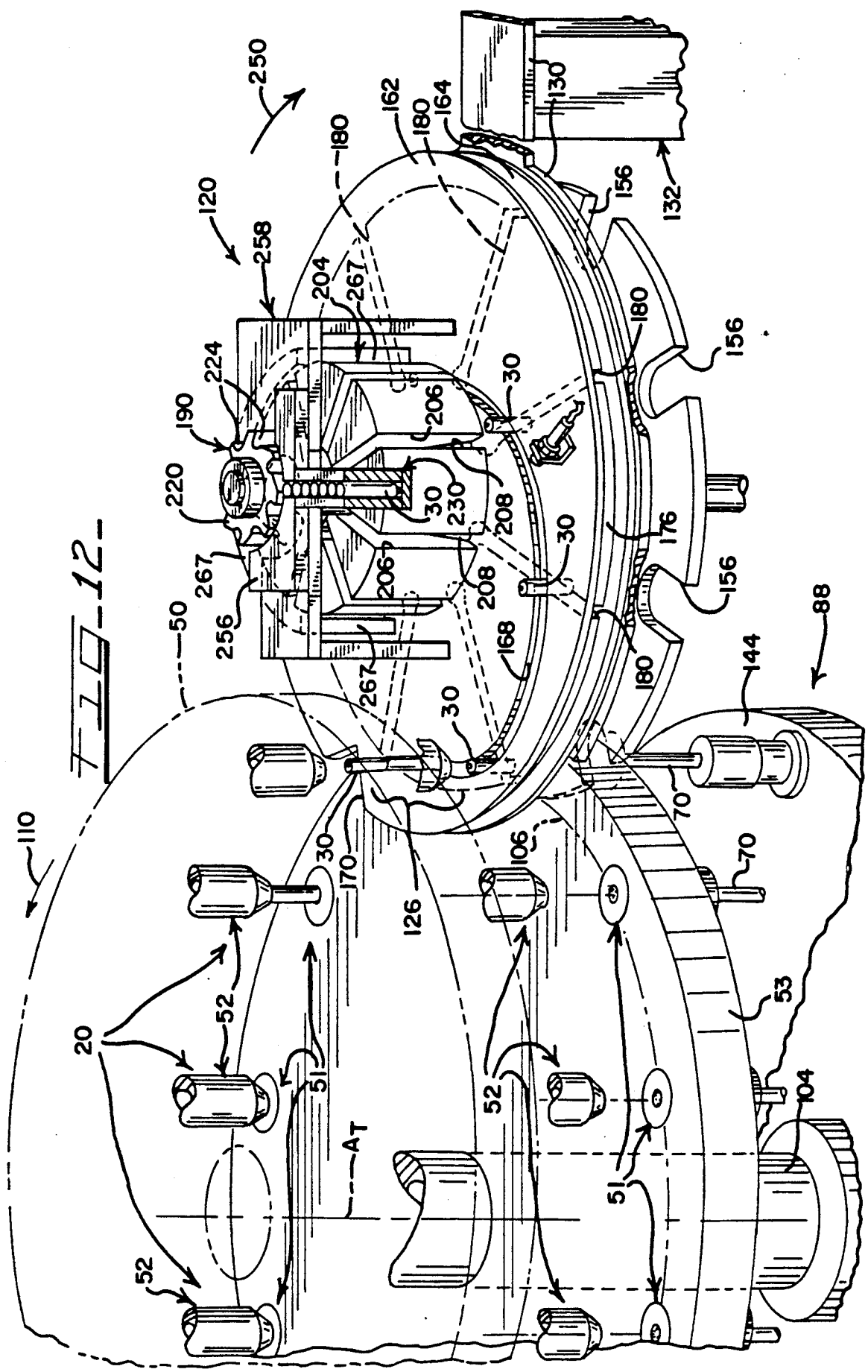

DRY CELL BATTERY CASING PROCESSING

TECHNICAL FIELD

This invention relates to a method and apparatus for fabricating a consolidated casing which is a subassembly of an open-ended dry cell battery casing and cathode material. Such a subassembly is produced in an intermediate stage of the manufacture of a complete dry cell battery.

BACKGROUND OF THE INVENTION

In certain types of galvanic dry cell batteries, such as the so-called alkaline type, the battery construction generally consists of a metallic casing or container (usually a suitable steel), an annular mass or mix of cathode material (e.g., a molded mixture of $MnO_2$ and graphite) in the casing, a separator membrane (e.g., a paper liner) on the inside surface of the annular molded cathode mix, and an electrolyte as well as an anode material (e.g., a zinc powder) in the form of a central anode core within the separator membrane.

The casing is generally cylindrical, is closed on one end, and is initially open at the other end for receiving the internal components and materials. Good physical contact between the cathode mix and the casing is required so as to provide the proper electrical conduction which is critical to battery performance. Consequently, it would be desirable to provide an improved method and apparatus for the manufacture of a dry cell battery which would result in good physical contact between the cathode mix and the surrounding surfaces of the casing. Further, it would be beneficial if an improved method and apparatus could efficiently provide good contact between the casing and cathode material on a consistent basis in high speed production operations.

The initially closed, circular end of the dry cell battery casing is typically provided with a positive terminal in the form of a centrally located flat contact region or an outwardly projecting and generally circular deformation, bulge, pip or the like for engaging the positive contact in an electrically operated device. The central anode core of the completed battery is generally disposed so that it is coaxial with the projecting terminal in the casing end wall. However, the anode material does not directly contact the interior surface of the terminal or the surrounding interior surface of the casing end wall owing to the presence of the separator membrane end which surrounds the end of the anode material. Also, in typical constructions, there is usually some cathode mix sandwiched between the casing end wall and the separator membrane end.

The presence of the cathode mix between the separator membrane at the end of the anode core and the end of the casing does not contribute substantially to the electro-chemical process. Consequently, this type of conventional dry cell battery does not efficiently utilize the portion of the cathode mix which is typically present in the space between the end of the anode core and the casing end wall, including inside the terminal. Thus, it would be advantageous to provide an improved method and apparatus for minimizing the presence of the cathode mix between the anode core and casing end wall during the manufacture of the dry cell battery.

The amount of cathode mix in the dry cell battery depends upon the density of the cathode material and on the volume in the dry cell battery casing that is occupied by the cathode material. Accordingly, it would be beneficial to provide an improved method and apparatus for the manufacture of a dry cell battery wherein the density of the cathode mix in the battery can be effectively and consistently controlled.

Further, it would be desirable to be able to accommodate the high-speed production of consolidated casings with the cathode mix while also having the capability to readily provide different amounts and densities of the cathode mix within the casings.

It would be advantageous if such an improved method and apparatus could operate in a substantially automated manner to feed the casings and cathode mix material to appropriate work stations for fabricating the consolidated assembly of the cathode material and dry cell battery casing. It would be beneficial if such an improved apparatus could also be employed with work stations carried on a rotating turret type device from which a casing feeding device could be driven.

SUMMARY OF THE INVENTION

The present invention provides a novel method and apparatus for more effectively fabricating an improved consolidated casing (i.e., a subassembly of cathode material in a dry cell battery casing having a closed end and an open end). The subassembly fabricated in accordance with the teachings of the present invention is characterized by good physical contact between the cathode material and the inside surface of the casing. The method and apparatus are effective to compact the cathode material in the casing to a desired density that is consistent from casing to casing and are effective to minimize cathode material waste. The method and apparatus readily accommodate adjustment to permit variation of the quantity or density of the cathode material in the casing.

Another feature of the invention facilitates the fabrication of the subassembly of cathode material and casing by a high speed process with a unique, automatic feeding of components and materials.

In a preferred form of the invention, the casing is filled with cathode material in an unusual orientation—namely, with the casing positioned so that its open end opens downwardly over a chamber containing a supply of the cathode material. The material is then moved upwardly, against the force of gravity, into the casing and is compacted therein. This results in a relatively uniform distribution of the material in a selected annular region of the casing, and this results in a more uniform density of the material while keeping usage of the cathode material to a minimum.

The consolidated casing with these improvements and advantages can be effectively and efficiently fabricated in accordance with the teachings of the present invention by an automated, high speed process which includes a unique automatic feeding of components and materials to filling stations for consolidation.

In a preferred form of the apparatus of the invention, open ended dry cell battery casings are filled with the cathode material at circumferentially spaced filling stations on a rotating turret. The filling stations are arranged in a circular array on the turret for revolving in a circular locus about the turret axis. Each filling station includes a die assembly means for receiving and engaging the casings in an orientation with the longitudinal axis of each casing aligned parallel to the turret axis of rotation.

In a preferred method of operation, each casing is fed along a path to a selected transfer region on the circular locus, then into a registry with one of the die assembly means for being received thereby, and finally along an arc of the circular locus in the transfer region at the same angular velocity as the turret. Each casing is engaged along the transfer region with the die assembly means in registry therewith whereby the casing is transferred to the rotating turret.

A novel apparatus is provided for feeding the casings to the turret. This includes, in a preferred form, a stationary guide means for guiding the casings along a feed path to the transfer region along an arc on the circular locus. In a preferred form, the guide means includes at least one plate having an arcuate slot defining the feed path. The apparatus also includes means for depositing the casings seriatim at an initial location in the guide means feed path.

A casing drive means is provided for moving each casing along the guide means path into registry with one of the die assembly means in the transfer region and for moving each casing along the arc on the circular locus in the transfer region at the same angular velocity as the turret. In a preferred embodiment, the casing drive means includes a rotatable drive plate having radial slots for each receiving a portion of a casing extending therein from the stationary guide path. The drive plate is rotated relative to the stationary guide means to impart a radial force on the casing which then moves along the guide path.

Each filling station die assembly has an upper die assembly and a lower die assembly which are in vertical registration, and each die assembly includes components for moving vertically toward and away from the other die assembly. As each filling station on the turret rotates past a cathode mix dispenser and toward the casing transfer region, a quantity of the fluent cathode mix is fed from the dispenser into an upwardly open receiving chamber of the lower die assembly.

At the transfer region the casing is positioned on the upper end of the lower die assembly with the casing open end opening downwardly over the filled chamber of the lower die assembly. The casing is retained in position on the lower die assembly while a core pin and an annular shoulder punch are elevated through the receiving chamber into the casing so as to force the cathode material into the casing. The core pin is surrounded by the annular shoulder punch and thus has a smaller diameter than the casing inside diameter. The core pin is preferably elevated in advance of the annular shoulder punch so as to position the upper distal end thereof in the casing adjacent the closed upper end of the casing. The cathode material is compacted in the annular space between the core pin and the casing as the annular shoulder punch is subsequently elevated into the casing around the core pin.

The method and apparatus effectively forms or molds a desired quantity of the cathode material into an annular configuration having the desired density or degree of compaction with good physical contact between the cathode material and the internal surface of the casing.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIGS. 1-9 are fragmentary, simplified, cross-sectional, diagrammatic views of the filling station apparatus of the present invention showing the sequence of operation according to the method of the invention for fabricating a consolidated casing in the form of a subassembly of cathode material molded in a dry cell battery casing;

FIG. 10 is a fragmentary, partly diagrammatic, plan view of the apparatus of the present invention;

FIG. 12 is a fragmentary, simplified, partly diagrammatic, perspective view of the apparatus showing the feeding of casings from the feeding assembly to the filling station turret.

DESCRIPTION OF THE PREFERRED EMBODIMENTS

Figure 11:
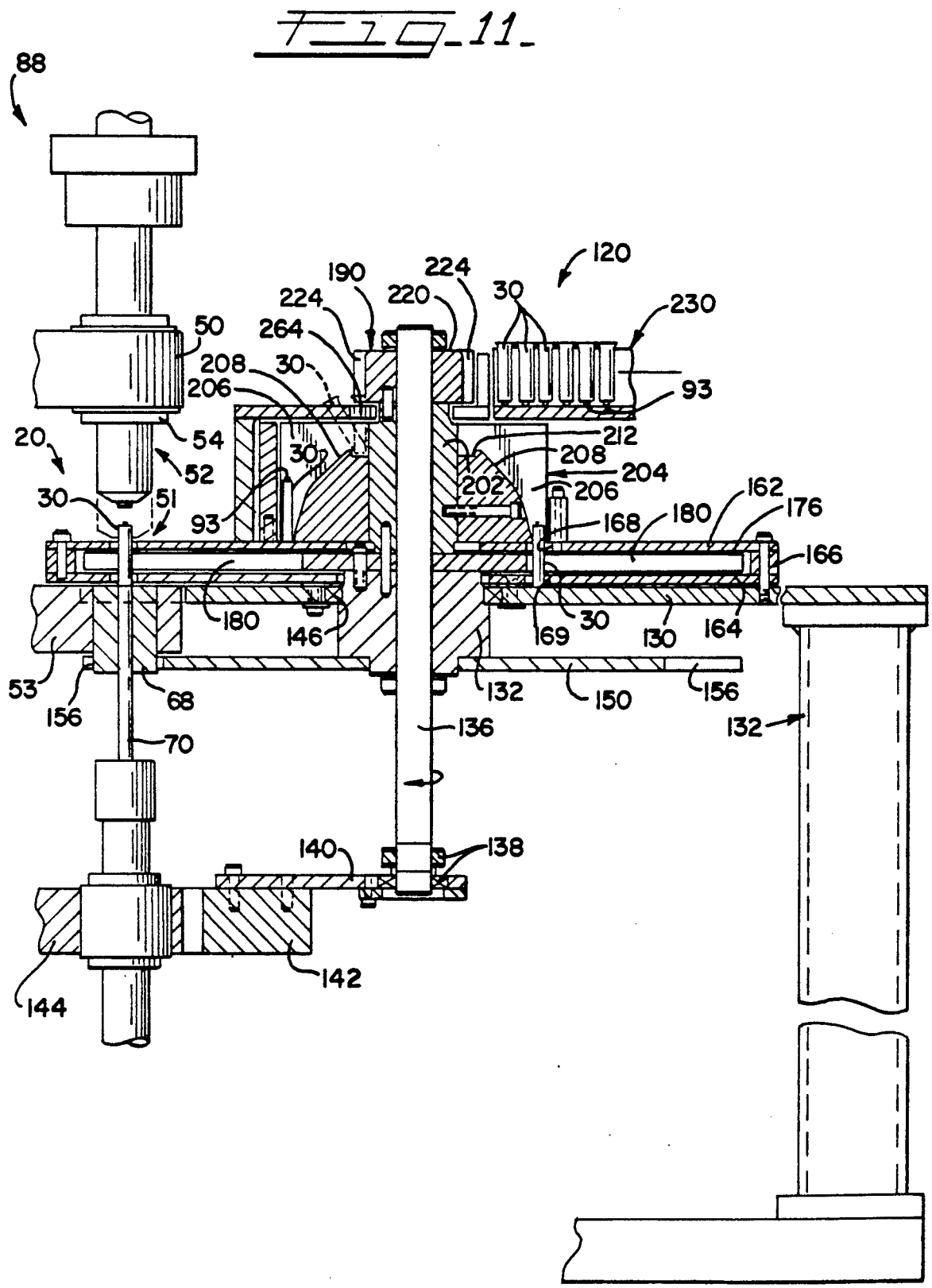
FIG. 11 is an enlarged, fragmentary, cross-sectional view taken generally along the planes 11—11 in FIG. 10.

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

The apparatus of this invention can be used with certain conventional components, including drive mechanisms, control mechanisms, and the like, the details of which, although not fully illustrated or described, will be apparent to those having skill in the art and in understanding of the necessary functions of such components.

Some of the figures illustrating the preferred embodiments of the apparatus show structural details and mechanical elements that will be recognized by one skilled in the art. However, the detailed descriptions of such elements are not necessary to an understanding of the invention, and accordingly, are not herein presented.

According to the present invention, a consolidated casing, in the form of a subassembly of cathode material molded in a dry cell battery casing, is effectively fabricated with a unique process and apparatus that compacts the cathode material in the casing in a generally annular configuration for receiving an anode structure.

One aspect of the invention involves a method and apparatus for feeding casings seriatim to a rotating turret assembly of filling stations wherein the cathode material is compacted in the casings. A unique feeding assembly adjacent the turret assembly employs a rotating drive plate to move each casing along a guide path into registry with a filling station on the turret assembly. Each casing is preferably moved by the feeding assembly through an arc of the filling station orbit at the same angular velocity as the filling station and in a timed relationship therewith so that it can be engaged by, and transferred to, the filling station.

A further aspect of the invention relates to a process and apparatus for filling the casings with the cathode material. In a preferred form of the invention, this is effected in the turret assembly of filling stations wherein each casing is oriented vertically over a chamber of cathode material in a filling station. The material is pushed upwardly into an open bottom end of the casing by a center pin and an annular punch so as to compact the cathode material to the desired density and with a suitable recess at the bottom of the casing. Good physical contact is obtained between the cathode material and the inside surface of the casing.

The sequential steps of this filling method and the sequential operation of a portion of the apparatus are illustrated in FIGS. 1–9 showing a filling station 20 at which a casing 30 is filled with a cathode mix or material 40. The casing 30 is deposited at, or fed to, the filling station 20 as schematically represented by the large arrow 42 in FIG. 2. In a preferred form of the invention, a novel apparatus 120 (FIG. 12) feeds a plurality of casings 30 seriatim to a revolving circular array of the filling stations 20 on a turret 88 (FIG. 12). The turret 88 and feeding apparatus 120 are described hereinafter following the further detailed description of the structure and operation of an individual filling station 20.

Each filling station 20 includes a lower die assembly 51 and an upper die assembly 52 which together function as a die assembly means for receiving and engaging the casing 30 (FIG. 2). In a preferred embodiment, each filling station 20 revolves about a vertical axis on a rotating frame of the turret 88 (FIG. 12) having an upper support member 50 and a lower support member 53.

The upper member 50 carries a bearing assembly 54 to accommodate the vertical reciprocation of the upper die assembly 52. The upper die assembly 52 includes a center anvil rod 58 which is received within an annular upper sleeve 60. The anvil rod 58 is vertically reciprocated by an actuator 62, and the upper sleeve 60 is vertically reciprocated by an actuator 64. The actuators 62 and 64 together constitute an upper die assembly actuating means.

The lower die assembly 51 includes a lower sleeve 68 mounted in the support member 53, an annular shoulder punch 70 slidably disposed within the sleeve 68, and a core pin 72 slidably disposed within the annular shoulder punch 70. An actuator 74 is provided for vertically reciprocating the core pin 72, and an actuator 76 is provided for vertically reciprocating the annular shoulder punch 70. The actuators 74 and 76 together constitute a lower die assembly actuating means.

Each actuator 62, 64, 74 and 76, in a preferred form, comprise suitable actuating devices connected to cam followers which revolve on cam tracks so as to effect the desired vertical movement of the associated die assembly component in the desired timed sequence that is described in detail hereinafter. Other types of actuators of conventional or special design, such as hydraulic actuators, may be employed. The detailed design and specific structure of the actuators 62, 64, 74 and 76 form no part of the present invention.

The components of the lower die assembly 51 and upper die assembly 52 are initially maintained by the actuators 62, 64, 74, and 76 in the fully retracted positions illustrated in FIG. 1. In the initial retracted positions, the upper die assembly sleeve 60 and anvil rod 58 are spaced above the lower die assembly 51. The lower die assembly shoulder punch 70 and core pin 72 are retracted downwardly relative to the sleeve 68 and define an upwardly open, cylindrical chamber 80 within the sleeve 68 above the upper distal ends of the punch 70 and pin 72.

The fluent cathode material 40 is fed into or deposited in the chamber 80. In a preferred embodiment wherein the filling station 20 is carried in a rotating turret, the support member 53 rotates in a horizontal plane so that the lower die assembly 51 carried therein revolves about a vertical axis of rotation in registry with the associated upper die assembly 52. The fluent cathode material 40 is continuously deposited at a fixed location on the rotating member 53 over the locus of revolution defined by the lower die assembly 51.

Preferably, a stationary cathode mix feeder bin 84 is provided at the fixed location over the member 53 for receiving the cathode mix 40 and containing it in the region above the plate 52. The bin 84 has a suitable inlet opening 86 for accommodating continuous or intermittent filling of the bin 84 with the cathode mix 40. The bottom of the bin 84 is open to the upper surface of the member 53, and hence to the cylindrical chamber 80 of the lower die assembly 51 as the lower die assembly 51 rotates into communication with the bottom of the bin 84. The bin 84 may be of any suitable conventional or special design, including the type of design employed in the feeder assembly for rotating turret-type presses of the conventional Stokes type. Such techniques and apparatus for filling a chamber in a rotating turret table or plate are well known in the art, and the detailed design and specific structure do not alone constitute, as such, any part of the present invention.

After the chamber 80 has been filled with the fluent cathode material 40, a casing 30 is positioned on the upper end of the lower die assembly as schematically illustrated in FIG. 2 by the large arrow 42. In a preferred form of the invention, wherein the filling station 20 is rotates in a turret assembly, the filling station 20 is rotated away from the cathode mix filling bin 84 to a casing transfer region wherein the casing 30 is introduced onto the circular locus of revolution of the filling station 20 (e.g., by means of a novel casing feeding apparatus described in detail hereinafter).

The casing 30 has a cylindrical shape and is typically fabricated from a suitable metal, such as steel. The casing has a circular closed in 91 which typically includes an outwardly projecting positive terminal 93 in the form of a generally circular deformation, bulge, or pip for engaging the positive contact in an electrically operated device. The other end of the casing 30 is initially open, and the casing 30 is positioned so that the open end opens downwardly over the lower die assembly receiving chamber 80 (FIG. 2). The terminal 93 projects upwardly, and the retracted upper die assembly anvil rod 58 preferably includes a recess 95 for accommodating the terminal 93 when the rod 58 is subsequently lowered to engage the casing 30.

The upper surface of the retracted lower die assembly 51 and of support member 53 define a reference elevation $I_0$ as shown in FIG. 2 which illustrates the initial, retracted positions of the lower and upper die assemblies 51 and 52, respectively. The upper die assembly anvil rod 58 is positioned so that its distal end is at an initial elevation $U_1$. The distal end of the upper die assembly sleeve 60 is located at an initial elevation $U_2$ which is slightly higher than the anvil rod initial elevation $U_1$.

In the lower die assembly 51, the upper distal ends of the annular shoulder punch 70 and core pin 72 are located at an initial, retracted elevation $L_1$. However, it is not necessarily critical that the ends of the punch 70 and pin 72 initially be located at the same elevation $L_1$. The end of either one of the members 70 and 72 may initially be above the other member so long as the volume defined in the chamber 80 is sufficient to accommodate the amount of cathode material 40 that is to be molded into the casing 30 in accordance with the desired degree of compaction.

Before compacting the cathode material 40 in the casing 30, the casing 30 is initially engaged and retained in position on the lower die assembly 51 as illustrated in FIG. 3. To this end, the upper die assembly 52 is extended downwardly by the actuators 62 and 64. Specifically, the anvil rod 58 is moved downwardly from its initially retracted position $U_1$ to a final, extended position $U_3$ to engage the closed end 91 of the casing, and the sleeve 60 is extended along with the anvil rod 58 from the initial, retracted position $U_2$ to a lower position $U_4$. The sleeve 60 continues to be extended downwardly around the outside of the casing 30 until the sleeve 60 is stopped just above, or upon engagement with, the upper surface of the lower die assembly 51 at elevation $I_0$.

During the extension of the upper die assembly 52 downwardly toward the lower die assembly 51, the lower die assembly 51 is maintained in the initially retracted position illustrated in FIGS. 1-4. The completion of the downward movement of the upper die assembly components to the fully extended positions illustrated in FIG. 4 results in the casing 30 being engaged and retained in proper position on the lower die assembly 51 so that the internal cylindrical cavity of the casing 30 is in registry with the lower die assembly cylindrical chamber 80.

With the casing 30 properly retained on the lower die assembly 51, the lower die assembly 51 is actuated as illustrated in FIG. 5 to begin to fill the casing 30 with the cathode mix 40. To this end, the core pin 72 is extended upwardly first by the actuator 74. Preferably, core pin 72 is moved up into the casing 30 all the way to its maximum length of travel as shown in FIG. 5 before the shoulder punch 70 moves up to compact cathode mix 40 into the casing.

It will be appreciated, however, that the punch 70 and core pin 72 may be moved up at different speeds. Further, in an alternate operation the distal end of the punch 70 and pin 72 may be moved together to an intermediate position $L_2$ (FIG. 6) just within the open end of the casing 30 with the core pin 72 continuing to move further into the casing 30 a desired distance. Also, the movement of the punch 70 may be temporarily interrupted just beyond the open end of the casing 30 while the core pin 72 is moved to the top of the casing 30.

In a preferred form of operation, the core pin 72 is first raised in a substantially continuous vertical movement to the final position illustrated in FIG. 5 wherein the distal end of the core pin 72 is substantially at the closed end of the casing 30 just below elevation $U_3$ before substantial compacting is effected by shoulder punch 70. In this manner, the continued movement of the core pin 72 to the final position adjacent the closed upper end of the casing serves to partially distribute and partially compact the cathode material 40 in an annular configuration 40' (FIGS. 5 and 6) within the casing 30 and against the casing wall.

It will be appreciated that the movement of the relatively smaller diameter core pin 72 up into the casing necessarily forces the cathode material into the annular space around the core pin 72. However, since the shoulder punch 70 has not been raised within the casing 30, the cathode material 40 has not been fully compacted but is relatively loosely held within the casing 30. Thus, as the core pin 72 continues to be elevated to the closed end of the casing 30, the movement of the core pin through the cathode material is easily accommodated. The cathode material 40 readily flows into the annular space, and very little cathode material is trapped at the upper end of the core pin 72 against the closed end of the casing 30. This is desirable since the cathode material adjacent the casing closed end 91 is not efficiently used in the electrochemical process of the completed battery. Thus, it is advantageous to minimize the amount of cathode material at that location.

After the core pin 72 has been raised to its final elevated position, the shoulder punch 70 is raised to a final elevated position $L_3$ (FIG. 7) so as to compact the annular configuration 40' of cathode material to the desired degree of compaction or density, and so as to provide the desired recess between the end of the molded cathode configuration 40' and the open end of the casing 30. The recess accommodates certain additional battery components, including the closure structure components.

In a preferred form of operation, the shoulder punch 70 and core pin 72 are raised to their final elevations $L_3$ and $U_3$, respectively, by the actuators 74 and 76, respectively, operating through a predetermined movement range (e.g., as defined by a suitable cam actuation system). Therefore, the degree of compaction, and the mass of cathode material molded into the casing 30, is dependent upon the actuator movement range which defines the initial elevation $L_1$ and the final elevations $L_3$ and $U_3$. By changing the range of movement of the actuators (or of the connecting linkages, such as the length of the punch 70 and core pin 72), the quantity and degree of compaction of the cathode material can be adjusted. Once the particular range of actuation movement is set, the method and apparatus of the invention is effective to consistently mold the same amount of cathode material 40 into the casings 30 at the same degree of compaction.

Other ways of controlling the amount and degree of compaction of the cathode material 40 can be employed. For example, either or both of the actuators 74 and 76 could be controlled through a suitable special or conventional force feedback system to apply a predetermined vertically directed force against the cathode material and casing. This could be effected with, for example, a hydraulic or pneumatic actuating system. Also, the amount of cathode material and density thereof within the casing could be controlled, to some extent, by initially compacting the cathode material in the receiving chamber 80 of the lower die assembly 51 as the cathode material 40 is fed into the chamber by some suitable feeding means employing an appropriate compacting or pressurization system.

In any case, after the cathode annular molded configuration 40' has been formed by movement of the lower die assembly components to the fully raised position (FIG. 7), the lower die assembly is retracted (FIG. 8). To this end, the shoulder punch 70 and core pin 72 are moved downwardly tot he initial, retracted elevation $L_1$. The core pin 72 and punch 70 may be moved downwardly, separately or together, and at the same or different rates of speed. In a preferred form of operation, the shoulder punch 70 is maintained at its final elevation $L_3$ while the core pin 72 begins retracting downwardly. Subsequently, the shoulder punch 70 is retracted, and the core pin 72 and shoulder punch 70 continue to react together to the fully retracted, initial elevation $L_1$ (FIG. 8).

As the core pin 72 is initially retracted downwardly away from its final elevated position adjacent the end of the casing (FIG. 7), the upper die assembly 52 begins retracting. Specifically, as illustrated in FIG. 8, the upper die assembly sleeve 60 retracts from its fully extended elevation adjacent the lower die assembly at elevation $I_0$ to the elevation $U_4$ wherein the distal end of the sleeve 60 just clears the upper end of the casing 30. However, the end of the anvil rod 58 remains engaged with the casing upper end (terminal 93) to properly hold the casing 30 while the components of the lower die assembly 51 are being retracted.

Finally, after the components of the lower die assembly 51 have been retracted out of the casing 30, the upper die assembly 52 is further elevated (as shown in FIG. 9) so as to raise the casing 30 off of the lower die assembly 51. The casing 30 remains engaged with the anvil rod 58 of the upper die assembly 52 by virtue of the engagement of the casing terminal 93 with the anvil rod recess 95 (clearly visible in FIGS. 1 and 2).

A suitable knock-off apparatus 100 is employed to knock the casing 30 out of engagement with the anvil rod 58 (and into a suitable receiving system, if desired). Typically, where the filling station 20 is part of a rotating turret, the knock-off apparatus 100 is provided along a point in the circular locus of revolution of the filling station 20 so that the casing 30 is knocked off of the upper die assembly 52 as the turret rotates the filling station 20 past that point.

A preferred turret apparatus for filling casings at filling stations carried thereon, and a novel method and apparatus for feeding casings to the turret apparatus will next be described with reference to FIGS. 10-12 wherein the turret apparatus is designated generally by the reference numeral 88. The turret 88 includes the spaced-apart rotating frame members 50 and 53 described above with reference to FIG. 1. In the turret 88, the members 50 and 53 each have a generally circular configuration and are mounted to a shaft 104 (FIGS. 10 and 12) for rotation about a vertical turret axis $A_T$ in the direction of the arrow 110. The shaft 104 is rotated by a suitable conventional or special drive system (not visible in the Figures), the details of which form no part of the present invention.

The plates 50 and 53 of the turret 88 carry the plurality of cathode mix filling stations 20 which include the lower and upper die assemblies 51 and 52, respectively, described in detail above with reference to FIGS. 1-9. The die assemblies of the filling stations 20 are arranged in a circular array on the turret 88 for revolving in a circular locus 106 about the turret axis $A_T$.

The casings 30 are fed to the filling stations 20 on the turret 88 by a novel feeding assembly 120. A portion of the feeding assembly 120 overlaps a peripheral portion of the turret 88. More specifically, a portion of the feeding assembly 120 overlaps an arc of the circular locus 106 (FIG. 10) in which the filling stations 20 revolve about the turret axis $A_T$. This overlapped region or arc of the locus 106 may be characterized as the transfer region 126 (FIG. 10) wherein the casings 30 are engaged seriatim by the filling station die assemblies as the filling stations 20 are rotated along the transfer region 126.

The feeding assembly 120 includes a fixed support plate 130 (FIG. 11) which is mounted at a portion of its periphery to a frame support 132. The center of the plate 130 receives a lower hub 132 which is oriented vertically on a shaft 136. The lower hub 132 is keyed to the shaft 136 and rotates with the shaft relative to the stationary support plate 130 within a bearing 146 (FIG. 11) mounted to a central aperture in the stationary support plate 130.

The shaft 136 is mounted at its lower end in a bearing assembly 138 on a lower support plate 140 carried by a stationary frame member 142. The member 142 is supported by a suitable framework (not visible in the figures) and surrounds a lower rotating plate 144 (FIG. 11) that receives the lower portions and associated bearing members of the lower die assembly 51.

A lower sprocket wheel 150 is mounted to the bottom of the lower hub 132 and defines a plurality of circumferentially spaced recesses 156 (FIGS. 11 and 12) which are aligned to be drivably engaged by the lower die assembly sleeves 68 of the filling station turret 88. The rotation of the turret 88 in one direction (e.g., in the direction of arrow 110 in FIGS. 10 and 12) thus causes rotation of the sprocket wheel 150 and feeding assembly components connected thereto in the opposite direction (e.g., in the direction of arrow 250 in FIGS. 10 and 12).

Mounted to the stationary support plate 130 are two spaced-apart stationary guide members or plates, upper guide member 162 and lower guide member 164. The guide members 162 and 164 are spaced apart by spacer members 166 at their outer most periphery.

With reference to FIG. 12, the upper guide member 162 defines an arcuate path in the form of a slot 168 extending from a central region of the guide member to the transfer region 126. In the transfer region 126, the slot 168 has a circular arc configuration identical to the arc of the circular locus defined by the revolution of the turret filling stations 20. The slot 68 opens at a cut-out or notch 170 in the periphery of the guide member 162. The lower guide member 164 has an identical slot 169 (FIG. 11) in registry with the upper guide member slot 168.

The casings 30 are deposited into the guide member slots 168 and 169 (by depositing means described in detail hereinafter) wherein they are guided to the transfer region 126 for engagement by the die assemblies of the filling stations 20 of the turret 88.

The casings 30 are caused to move along the guide plate slots 168 and 169 by a drive plate 176 which is disposed between the upper stationary guide member 162 and the lower stationary guide member 164. The drive plate 176 is mounted to the top of the lower hub 132 for rotation with the lower hub 132 and shaft 136.

The drive plate 176 has a plurality of radially oriented slots 180. Each slot 180 extends from a central region of the drive plate 176 opens at the peripheral edge of the plate 176. Each slot 180 is adapted to receive a casing 30 which is deposited from a depositing device or means 190 vertically downwardly through the upper stationary guide member arcuate slot 168 and into the drive plate slot 180. As illustrated in FIG. 11, the casing 30 projects downwardly below the slot 180 of the drive plate 176 into the arcuate guide slot 169 of the lower guide member 164 which is in registry with the arcuate guide slot 168 of the upper guide member 162. The bottom of the casing 30 rests on the stationary support plate 130 and slides therealong as the rotating drive plate 176 moves the casing along the arcuate guide slots 168 and 169 to the filling station turret 88.

The depositing device 190 is mounted above the upper guide member 168 and includes an upper inner hub 202 keyed to the shaft 136 and an upper, outer hub 204 mounted to the inner hub 202. As shown in FIG. 12, the outer hub 204 includes a plurality of circumferentially spaced, radial channels 206. The bottom of each channel 206 is defined by a slanting slide surface 208 (FIG. 11). Each channel 206 is aligned in vertical registry with an underlying slot 180 in the drive plate 176. The upper end of the upper, outer hub 204 defines an upwardly opening recess 212 (FIG. 11) communicating with the associated channel 206.

A casing 30 is fed to the recess 212 by a rotating feeder element 220 which is part of the depositing device 190 and is mounted to the top of the upper, inner hub 202 for rotation therewith. The rotating feeder element 220 defines a plurality of circumferentially spaced, vertically oriented, recesses 224 for each receiving a casing 30 conveyed to the element 220 along a channel structure 230 (FIGS. 11 and 12). The means for conveying the casings 30 along the channel structure 230 may be any suitable special or conventional mechanism, the details of which form no part of the present invention.

As shown in FIGS. 11 and 12, each casing 30 is disposed with the positive terminal end 93 located at the bottom and with the casing open end at the top. In operation, the casings 30 are conveyed along the channel structure 230 to the rotating feeder element 220 which engages the casings 30 seriatim in the individual recesses 224. As the casings 30 are rotated in the feeder element 220 (in the direction of the arrow 250 in FIG. 10), the casings 30 are initially maintained in the vertical orientation by a stationary retaining plate 256 (FIG. 12) on a table 258 mounted to the upper guide plate 162. After the rotating feeder element 220 has carried a casing 30 beyond the end of the retaining plate 256, the casing 30 is free to tip radially outwardly (as illustrated in a phantom line in FIG. 11), and the tipping of the casing 30 is positively effected by engagement of the casing 30 with a camming edge 264 (FIGS. 10 and 11) of the table 258 which extends inwardly under the rotating feeder element 220.

As shown in FIG. 11, the casing 30 tips outwardly and slides down the slanted surface 208 in the depositing device hub channel 206. The casing 30 thus becomes inverted in a vertical orientation wherein the positive terminal 93 is at the top, and the open end is at the bottom on the stationary guide member 162. The casing 30 continues to be carried in the channel 206 of the rotating hub 204 in a circular arc on the surface of the stationary guide member 162. A semicircular wall 267 (FIGS. 10 and 11) keeps the casing 30 in the rotating hub channel 204. After being carried part way around the guide member 162, the casing falls into the arcuate guide slot 168. The lower portion of the casing 30 extends further through the assoCiated radial slot 180 of the drive plate 176 that is rotating with the hub 204 and also extends into the arcuate guide slot 169 of the lower guide member 164. The bottom, open end of the casing 30 is then supported on the upper surface of the stationary support plate 130 as the casing 30 is driven along the registered guide slots 168 and 169 by the rotating drive plate 176.

As can be seen from FIG. 10, as each radial drive slot 180 rotates into position under the inner ends of the guide slots 168 and 169, each drive slot 180 receives a casing 30 dropping downwardly from the rotating hub 204, and, at any point in time, the guide member arcuate slots 168 and 169 contain a plurality of spaced-apart casings 30 being driven toward the transfer region 126 (FIGS. 10 and 12).

In the preferred method of operating the apparatus, the casings 30 are moved along the transfer region 126 by the feeding assembly 120 at the same angular velocity as the turret 88 so that the filling stations 20 and casings 30 have the same speed along the path in the transfer region 126. This is accomplished by appropriate design of the component diameters and of the spacing of the drive recesses 156 in the sprocket wheel 150.

As a casing 30 is driven along the arcuate guide slots (registered slots 168 and 169 in the upper guide member 162 and lower guide member 164, respectively) in the transfer region 126, the die assemblies 51 and 52 of a filling station 20 move into registry with the casing 30 in the transfer region 126. This registration is assured by appropriate design of the feeding assembly diameter and of the arcuate guide slot configuration in conjunction with the spacing of the filling stations 20 and spacing of the drive recesses 156 on the drive wheel 150.

As a filling station 20 comes into registry with a casing 30 at the upstream end of the transfer region 126, the filling station upper die assembly 52 is extended vertically downwardly to engage the casing against the top of the lower die assembly 51 as previously described in detail with reference to FIGS. 1-9. The actuation of the filling station die assemblies 51 and 52 is preferably controlled by conventional cam roller/cam track actuators in response to the azimuthal position of the filling station 20 on the turret. The details of the structure and operation of such actuators form no part of the present invention. By the time the engaging filling station 20 has been rotated with the turret 88 to the downstream end of the transfer region 126, the casing 30 has been fully engaged by the filling station 20 (wherein the upper die assembly upper sleeve 60 has extended downwardly completely around the casing 30 as illustrated in FIG. 4).

As the filling station 20 rotates away from the transfer region 126, the subsequent operation of the lower die assembly 51 and upper die assembly 52 is effective to mold the cathode material into the annular configuration within the casing 30 as previously described in detail with reference to FIGS. 1-9. These subsequent operations occur as the filling station 20 rotates with the turret 88. Before the filling station 20 again enters the transfer region 126, the filling station die assemblies are retracted as previously explained (with reference to FIGS. 1-9), and the filled casing 30 is disengaged and removed from the turret 88 by appropriate mechanisms, the details of which form no part of the present invention.

The apparatus of the present invention functions effectively at high speeds to automatically feed and fill dry cell battery casings. The casings are automatically and positively fed seriatim in a proper, timed relationship to the filling station components wherein the casings are effectively and efficiently filled with the desired amount of cathode mix at the desired density.

It will be readily observed from the foregoing detailed description of the invention and from the illustrated embodiments thereof that numerous variations and modifications may be effected without departing from the true spirit and scope of the novel concepts or principles of this invention.

What is claimed is:

1. An apparatus for fabricating a consolidated assembly of cathode material and a dry cell battery casing having a closed end and an open end, said apparatus comprising:

(a) a lower die assembly having a lower sleeve with an upwardly open end, an annular shoulder punch slidably disposed in said lower sleeve, and a core pin slidably disposed within said annular shoulder;

(b) a casing retaining means for retaining said casing in a position with said casing open end opening downwardly over said upwardly open end of said lower sleeve; and (c) lower die assembly actuating means for moving said shoulder punch and core pin relative to each other and relative to said lower sleeve, said lower die assembly actuating means including:

(1) means for moving said shoulder punch and core pin to an initial position retracted downwardly in said lower sleeve wherein an upwardly open cathode material receiving chamber is defined within said lower sleeve between said lower sleeve open end and the upper distal ends of said core pin and shoulder punch, (2) means for moving said core pin to an extended final position wherein the upper distal end of said core pin extends upwardly beyond the upper distal end of said shoulder punch to a location adjacent the closed upper end of said casing, and (3) means for moving said shoulder punch to an extended final position wherein the upper distal end of said shoulder punch is elevated above its initial position to compact said cathode material in said casing into an annular configuration around said core pin.

2. The apparatus in accordance with claim 1 in which said lower die actuating means includes means for moving said shoulder punch and core pin upwardly together from said initial position into said casing with the upper ends of said shoulder punch and core pin moving in horizontal registry to a predetermined intermediate elevation above which relative movement occurs between said shoulder punch and core pin.

3. The apparatus in accordance with claim 2 in which said lower die actuating means includes means for moving said shoulder punch and core pin from said initial position through said intermediate elevation to said final positions with substantially continuous vertical movements.

4. The apparatus in accordance with claim 1 in which said casing retaining means includes an upper die assembly over said lower die assembly, said upper die assembly comprising an upper sleeve having a downwardly open end and an anvil rod disposed within said upper sleeve to accommodate relative longitudinal movement between said upper sleeve and said anvil rod; and said apparatus includes an upper die actuating means for moving said upper sleeve and anvil rod relative to each other and relative to said lower die assembly, said upper die actuating means including means for moving said anvil rod between a retracted initial position above said casing and an extended final position for engaging said casing closed end, and means for moving said upper sleeve from an initial position retracted above the distal end of said anvil rod to an extended final position around said casing and abutting said lower sleeve.

5. An apparatus for fabricating a consolidated assembly of cathode material and a dry cell battery casing having a closed end and an open end, said apparatus comprising:

(a) a lower die assembly including a lower sleeve having an upwardly open end, an annular shoulder punch slidably disposed in said lower sleeve, and a core pin slidably disposed within said annular shoulder;

(b) an upper casing retaining means for retaining said casing in a position with said casing open end opening downwardly over said upwardly open end of said lower sleeve; and (c) lower die assembly actuating means for moving said shoulder punch and core pin relative to each other and relative to said lower sleeve, said lower die actuating means including means for moving said shoulder punch and core pin to the following positions:

(1) initial relative positions retracted downwardly in said lower sleeve wherein an upwardly open chamber for receiving said cathode material is defined within said lower sleeve between said lower sleeve open end and the upper distal ends of said core pin and shoulder punch, (2) intermediate relative positions wherein the upper distal end of said core pin extends upwardly beyond the upper distal end of said shoulder punch to a position adjacent the closed upper end of said casing, and (3) final relative positions wherein the upper distal end of said shoulder punch is elevated above its intermediate position to compact said cathode material in said casing into an annular configuration recessed from said open end.

* * * * *